(12) United States Patent
　　Aoshima

(10) Patent No.: US 12,656,242 B2
(45) Date of Patent: Jun. 16, 2026

(54) CORROSION SENSOR CIRCUIT

(71) Applicant: Mitsubishi Electric Corporation, Tokyo (JP)

(72) Inventor: Takuma Aoshima, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 232 days.

(21) Appl. No.: 18/262,118

(22) PCT Filed: Mar. 23, 2021

(86) PCT No.: PCT/JP2021/012025
§ 371 (c)(1),
(2) Date: Jul. 19, 2023

(87) PCT Pub. No.: WO2022/201317
PCT Pub. Date: Sep. 29, 2022

(65) Prior Publication Data
US 2024/0077408 A1 Mar. 7, 2024

(51) Int. Cl.
*G01N 17/02* (2006.01)
*G01N 27/04* (2006.01)

(52) U.S. Cl.
CPC ............. *G01N 17/02* (2013.01); *G01N 27/04* (2013.01)

(58) Field of Classification Search
CPC ......... G01N 17/02; G01N 17/04; G01N 17/20
See application file for complete search history.

(56) References Cited

U.S. PATENT DOCUMENTS

| | | | | |
|---|---|---|---|---|
| 2007/0193887 A1* | 8/2007 | Tormoen | G01N 17/02 | |
| | | | 205/775.5 | |
| 2013/0149195 A1* | 6/2013 | Hamann | G01N 27/00 | |
| | | | 422/53 | |
| 2016/0356698 A1* | 12/2016 | Chou | G01N 17/04 | |
| 2023/0152263 A1* | 5/2023 | Hidaka | F16K 31/007 | |
| | | | 324/693 | |

FOREIGN PATENT DOCUMENTS

| | | | | |
|---|---|---|---|---|
| CN | 108169112 A | * | 6/2018 | .......... G01N 27/041 |
| JP | H03-158748 A | | 7/1991 | |
| JP | 2006-337169 A | | 12/2006 | |
| JP | 2008175662 A | * | 7/2008 | |
| JP | 2014153089 A | * | 8/2014 | |
| JP | 2020-143999 A | | 9/2020 | |

OTHER PUBLICATIONS

International Search Report of the International Searching Authority mailed May 18, 2021 in the corresponding International Application No. PCT/JP2021/012025 (and English translation).
Office Action dated Oct. 31, 2023 issued in corresponding Japanese Application No. 2023-508222 (and English machine translation).

* cited by examiner

*Primary Examiner* — Shizhi Qian
(74) *Attorney, Agent, or Firm* — Posz Law Group, PLC

(57) ABSTRACT
A corrosion sensor circuit includes a microcontroller, corrosion sensors, resistors serving as pull-up resistors, and a resistor serving as a pull-down resistor. The corrosion sensors are connected to power terminals at their respective one ends. The resistors have their respective one ends connected respectively to respective opposite ends of the corrosion sensors and have their respective opposite ends connected to an input port of the microcontroller. The resistor is connected to the input port at one end and to ground at an opposite end, being connected to no corrosion sensors.

18 Claims, 6 Drawing Sheets

800

CORROSION SENSOR CIRCUIT

CROSS REFERENCE TO RELATED APPLICATION

This application is a U.S. national stage application of PCT/JP2021/012025 filed on Mar. 23, 2021, the contents of which are incorporated herein by reference.

FIELD

The present disclosure relates to a corrosion sensor circuit that detects a corrosion state of an apparatus, a corrosion detection sensor including the corrosion sensor circuit, a corrosion diagnosis system, and an air conditioner.

BACKGROUND

There are many cases where commercial air conditioners installed in buildings or offices are used beyond their design lives in markets. In addition, commercial air conditioners are sometimes used in environments unsuitable as conditions of use. Recently, a system has been developed to detect a corrosion state of a component of an air conditioner and prompt to maintenance before the air conditioner breaks down. Furthermore, Patent Literature 1 given below discloses a corrosion monitoring device for a printed circuit board that is used in an environment where a corrosive gas is present.

PATENT LITERATURE

Patent Literature 1: Japanese Patent Application Laid-open No. H03-158748

However, current air conditioners do not have corrosion detection sensors installed. Furthermore, with the conventional technique as represented by Patent Literature 1, effectively utilizing functions of existing components is difficult. Therefore, problems with the conventional technique are an increase in circuitry scale and an increase in manufacturing costs. Besides, it goes without saying that effectively utilizing the functions of the existing components is useful so as to install a corrosion detection sensor not only in air conditioners but also in other apparatuses.

SUMMARY

The present disclosure has been made in view of the above, and an object of the present disclosure is to obtain a corrosion sensor circuit capable of estimating a corrosion state of an apparatus, while preventing increases in circuitry scale and manufacturing costs.

In order to solve the above-stated problems and achieve the object, a corrosion sensor circuit according to the present disclosure serves as a corrosion sensor circuit that detects a corrosion state of an apparatus. The corrosion sensor circuit includes a microcontroller and one or more corrosion sensors connected to one of an input port and an output port of the microcontroller. The corrosion sensor circuit also includes one or more first resistors connected to the one of the input port and the output port. Each of the one or more first resistors is connected to each of the one or more corrosion sensors, respectively. The corrosion sensor circuit also includes a second resistor that is connected to the one of the input port and the output port. The second resister is not connected to the corrosion sensor.

The corrosion sensor circuit according to the present disclosure has an effect of estimating the corrosion state of the apparatus, while preventing increases in circuitry scale and manufacturing costs.

DETAILED DESCRIPTION

With reference to the accompanying drawings, a detailed description is hereinafter provided of corrosion sensor circuits, corrosion detection sensors, a corrosion diagnosis system, and an air conditioner according to embodiments of the present disclosure. In the following description, physical connection and electrical connection are simply referred to as "connections" without being distinguished from each other. In other words, the term "connection" refers to both constituent elements' direct connection and the constituent elements' indirect connection via another constituent element.

First Embodiment

Figure 1:
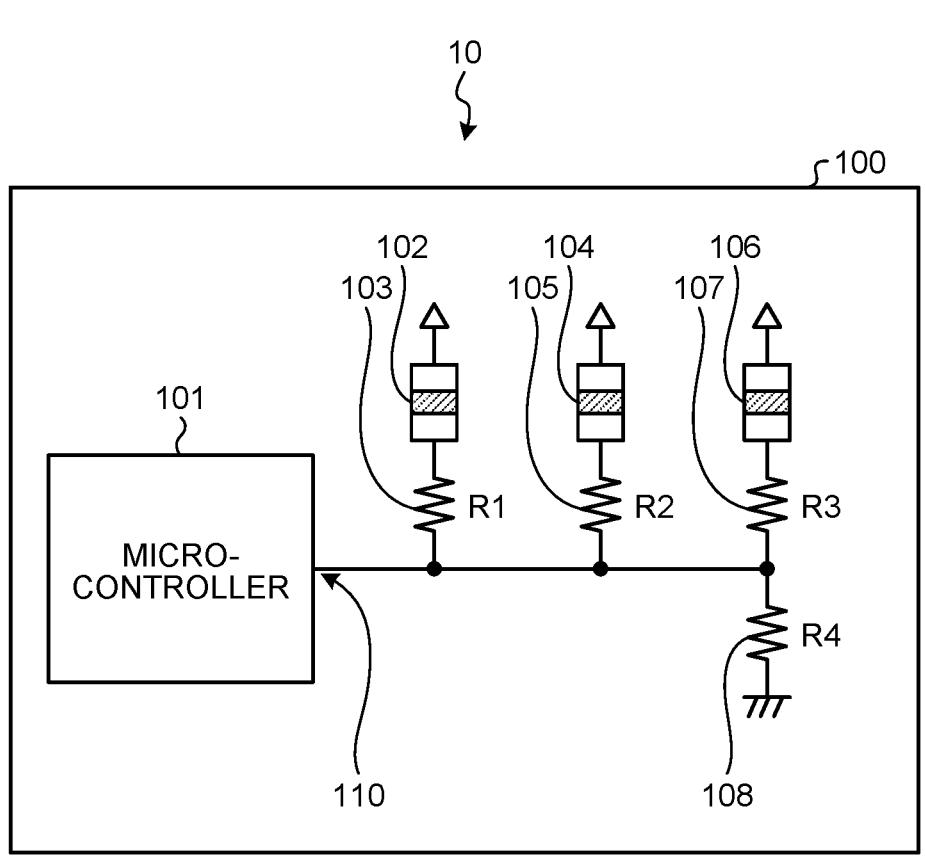
FIG. 1 is a diagram illustrating a configuration example of a corrosion sensor circuit according to a first embodiment.

FIG. 1 is a diagram illustrating a configuration example of a corrosion sensor circuit 10 according to a first embodiment. As illustrated in FIG. 1, the corrosion sensor circuit 10 includes a microcontroller 101, corrosion sensors 102, 104, and 106, and resistors 103, 105, 107, and 108. These constituent elements are mounted on a printed board 100. The corrosion sensor circuit 10 is installed in an apparatus to detect a corrosion state of the apparatus. The apparatus is, for example, an air conditioner. The printed board 100 mounted with the corrosion sensor circuit 10 can be installed in various apparatuses as a corrosion detection sensor.

The microcontroller 101 includes an input port 110. The corrosion sensor 102 is connected to a power terminal at one end and to the input port 110 via the resistor 103 at an opposite end. The corrosion sensor 104 is connected to a power terminal at one end and to the input port 110 via the resistor 105 at an opposite end. The corrosion sensor 106 is connected to a power terminal at one end and to the input port 110 via the resistor 107 at an opposite end. The resistor 108 is connected to the input port 110 at one end and to ground at an opposite end. When viewed from the input port 110, a power terminal side is called the "pull-up side", and a ground side is called the "pull-down side". In other words, the resistors 103, 105, and 107 are pull-up resistors connected to the corrosion sensors 102, 104, and 106, respectively. The resistor 108 is a pull-down resistor connected to no corrosion sensors.

In this description, the resistors 103, 105, and 107 connected to the corrosion sensors 102, 104, and 106 may be collectively referred to as the "first resistors", and the resistor 108 not connected to the corrosion sensors 102, 104, and 106 may be referred to as the "second resistor". The corrosion sensors 102, 104, and 106 may be referred to as the "first corrosion sensor", the "second corrosion sensor", and "the third corrosion sensor", respectively.

The corrosion sensors 102, 104, and 106 have characteristics such that as their corrosions progress, their resistance values gradually increase and eventually result in an open state. While the three corrosion sensors 102, 104, and 106 are illustrated in FIG. 1, this is not a limiting example. Provided at least one corrosion sensor is connected to the microcontroller 101, the corrosion detection is possible. Two or more corrosion sensors may be combined. If, in this case, a plurality of corrosion sensors are arranged which react to properties of different corrosive substances respectively, detecting which substance has caused corrosion is possible. Examples of the corrosive substances include hydrogen sulfide, sulfur dioxide, and chlorine gas, among others. Corrosion sensors made of different metals as materials may be arranged separately, each selectively reacting to the property, to enable the detection of which substance has caused corrosion.

The corrosion sensors 102, 104, and 106 may be made of the same metal and have different metal thicknesses. Arranging variations with adjusted metal thicknesses as the corrosion sensors 102, 104, and 106 enables the microcontroller 101 to estimate a degree of corrosion of the corrosion sensors 102, 104, and 106 on the basis of information obtained at the input port 110.

Respective resistance values of the resistors 103, 105, 107, and 108 are represented respectively by R1, R2, R3, and R4 here. The resistance values R1, R2, and R3 may be identical values but are preferably somewhat separated resistance values. In this way, which of the corrosion sensors 102, 104, and 106 has had an increase in resistance value can be determined with voltage at the input port 110 or an amount of change in the voltage.

While, in a series circuit consisting of the corrosion sensor 102 and the resistor 103 to which a power supply voltage is applied, the corrosion sensor 102 is disposed on its high potential side and the resistor 103 is disposed on its low potential side in the configuration of FIG. 1, this is not limiting. The series circuit may have its connection order reversed. In other words, the resistor 103 may be disposed on the high potential side, with the corrosion sensor 102 disposed on the low potential side. The same applies to a series circuit consisting of the corrosion sensor 104 and the resistor 105 and a series circuit consisting of the corrosion sensor 106 and the resistor 107.

In the configuration of FIG. 1, the corrosion sensors 102, 104, and 106 and the resistors 103, 105, and 107 are disposed on the pull-up side, while the resistor 108 is disposed on the pull-down side. However, this arrangement may be reversed. In other words, the resistor 108 may be disposed on the pull-up side, with the corrosion sensors 102, 104, and 106 and the resistors 103, 105, and 107 disposed on the pull-down side.

The circuit components mounted on the printed board 100 are to be exposed to identical or similar environments. Therefore, not only the corrosion sensors 102, 104, and 106 but also the microcontroller 101 and the resistors 103, 105, 107, and 108 may corrode. For this reason, these circuit elements, namely the circuit components peripheral to the corrosion sensors 102, 104, and 106 preferably have corrosion-resistant coatings, with the corrosion sensors 102, 104, and 106 having no corrosion-resistant coatings. By using such a configuration, accuracy of corrosion detection can be increased.

Figure 2:
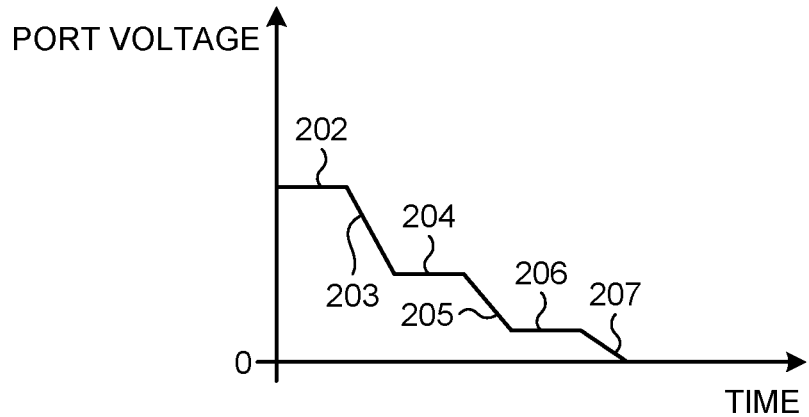
FIG. 2 is a diagram explaining an operation of the corrosion sensor circuit according to the first embodiment.

With reference to FIGS. 1 and 2, a description is provided next of operation of the corrosion sensor circuit 10 according to the first embodiment. FIG. 2 is a diagram explaining an operation of the corrosion sensor circuit 10 according to the first embodiment. In FIG. 2, a vertical axis represents port voltage, and a horizontal axis represents time. The port voltage refers to a voltage value that is input to the input port 110 of the microcontroller 101 and is read by the microcontroller 101. In the example of FIG. 2, settings are such that R1=100 [kΩ], R2=50 [kΩ], and R3=10 [kΩ]. In other words, the resistance values R1, R2, and R3 are set at different values. The resistance value R4 is set at any value.

In a case where the resistance values R1, R2, and R3 are set at different values, the port voltage and the amount of change in port voltage will be different when one of the corrosion sensors 102, 104, and 106 is open. For example, while the amount of change is not significant when the corrosion sensor 102 with the greatest resistance value, 100 [kΩ], is open, the amount of change is significant when the corrosion sensor 106 with the smallest resistance value, 10 [kΩ], is open.

The microcontroller 101 can recognize which sensor has become open by reading the amount of change in port voltage. FIG. 2 illustrates how the port voltage changes when the corrosion sensors 106, 104, and 102 become open in this order, that is to say, in order of increasing resistance value.

All the corrosion sensors 102, 104, and 106 are not open initially, in which state, for the power supply voltage, a voltage dividing ratio between the three series circuits' combined resistance value (R1, R2 and R3) and the resistance value R4 appears at the input port 110. In this state, the port voltage is represented by a flat section 202. As time passes thereafter, the corrosion of each corrosion sensor progresses, causing the resistance value of each corrosion sensor to gradually increase. Accordingly, the port voltage decreases following a descent section 203. On the basis of slope of the descent section 203 with respect to time, that is to say, a rate of change of the port voltage with respect to time, or in yet other words, the amount of change in port voltage over time, the degree of corrosion can be estimated. Therefore, without waiting for the corrosion sensor to become open, the progress of the corrosion as predictive information can be displayed on a display or stored in a memory of the microcontroller 101 or an external storage device. It is to be noted that the flat section 202 is not necessarily flat but is depicted as a straight line parallel to the horizontal axis in FIG. 2 for convenience' sake. The same applies to flat sections 204 and 206 to be described later. Furthermore, while the descent section 203 depicts the port voltage decreasing linearly for convenience' sake, the port voltage does not necessarily decrease linearly. The same applies to descent sections 205 and 207 to be described later.

As the corrosion of each corrosion sensor progresses further, the corrosion sensor 106 becomes open. In this case, the port voltage drops to the flat section 204. On the basis of this amount of voltage drop, the corrosion sensor 106 can be detected as having become open.

As the corrosion of each corrosion sensor progresses further, the corrosion sensor 104 becomes open. In this case, the port voltage, along the descent section 205, drops to the flat section 206. When the corrosion sensor 102 finally becomes open, the resistor 108, which is the pull-down resistor, becomes the only resistor connected to the input port at this stage. Therefore, the voltage drops along the descent section 207 and becomes 0 [V].

The corrosion sensors 102, 104, and 106 may be made of different metals to react to properties of different corrosive substances. With this configuration, which metal's corrosion has the effect on the voltage drop can be detected based on the drop amount or the slope of each voltage drop. Moreover, determining whether a rate of corrosion is faster or slower is possible on the basis of a relationship between the slope of the measured voltage drop and a theoretical value or a relationship between the slope of the measured voltage drop and an empirical value of slope of a past voltage drop.

The corrosion sensors 102, 104, and 106 may be made of the same metal and have different metal thicknesses. The corrosion sensors 102, 104, and 106 configured thus become open in order of increasing thickness. Therefore, the port voltage's reaching the flat sections 202, 204, and 206 enables the corrosion rate to be more accurately estimated in the respective stages. Since the descent sections 203, 205, and 207 have different slopes, data about the slopes of the descent sections 203, 205, and 207 are preferably stored in the memory of the microcontroller 101 or the external storage device. In this way, the corrosion rate can be more accurately estimated for each of the stages.

As described above, the corrosion sensor circuit according to the first embodiment includes the microcontroller; the one or more corrosion sensors connected to the input port of the microcontroller; one or more first resistors connected to the input port, the one or more first resistors being connected respectively to the one or more corrosion sensors; and the second resistor connected to the input port, the second resistor not being connected to the corrosion sensor. The microcontroller detects the voltage at the input port and detects a corrosion state of the corrosion sensor based on the detected voltage. Alternatively, the microcontroller detects a logical value at the input port and detects the corrosion state of the corrosion sensor based on the detected logical value. If the corrosion sensor circuit thus configured is installed and used in the apparatus, an effect can be obtained that the corrosion state of the apparatus can be estimated, while preventing increases in circuitry scale and manufacturing costs.

In cases where there are the plurality of the corrosion sensors, the microcontroller may detect, for each of the corrosion sensors, differences of the resistance values of the series circuits of the corrosion sensors and the first resistors and identify, on the basis of information on the differences, the corrosion sensor connected in one of the series circuits whose resistance value indicates the open state. In this way, a substance that is a main cause of the corrosion can be identified. It is to be noted that the substance that is the main cause of the corrosion may be identified on the basis of the amount of change in the voltage detected at the input port or a change of the logical value detected at the input port.

In cases where there are the plurality of the corrosion sensors that are made of the same metal but with different metal thicknesses, the microcontroller may compute amounts of changes in resistance values of the series circuits of the corrosion sensors and the first resistors and estimate the degree of corrosion on the basis of a mean of the amounts of changes. In this way, corrosion estimation accuracy can be increased.

When the order in which the first resistors' resistance values indicate the open state and a relationship between a rate of increase in resistance value and a rate of decrease in voltage to be detected are known in advance, the degree of corrosion of the corrosion sensor may be estimated on the basis of the rate of decrease in voltage. In this way, the corrosion estimation accuracy can be increased.

Second Embodiment

Figure 3:
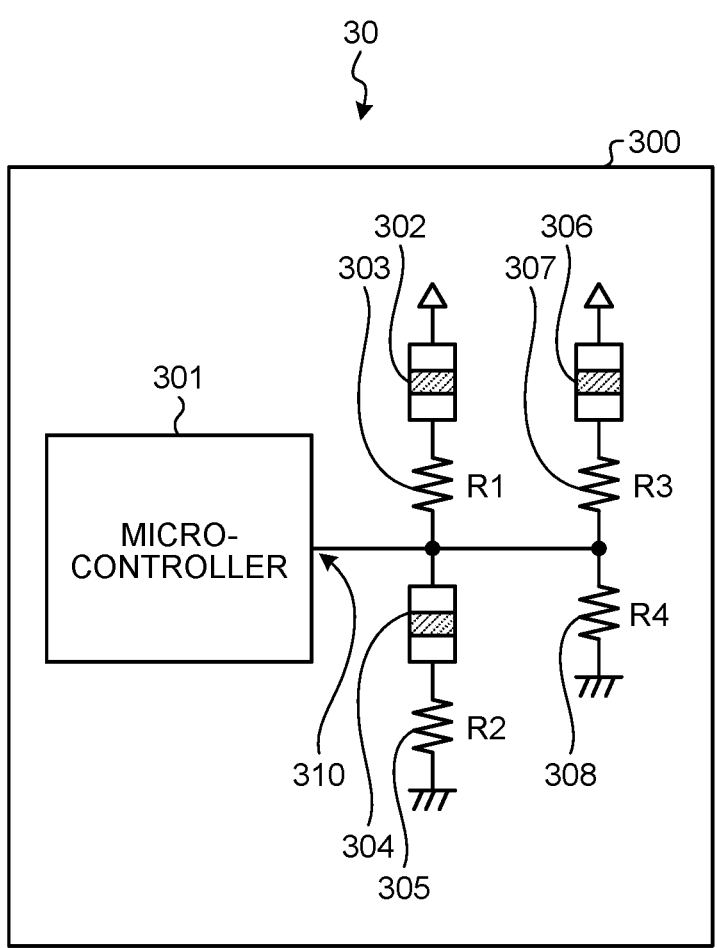
FIG. 3 is a diagram illustrating a configuration example of a corrosion sensor circuit according to a second embodiment.

FIG. 3 is a diagram illustrating a configuration example of a corrosion sensor circuit 30 according to a second embodiment. As illustrated in FIG. 3, the corrosion sensor circuit 30 includes a microcontroller 301, corrosion sensors 302, 304, and 306, and resistors 303, 305, 307, and 308. These constituent elements are mounted on a printed board 300. The corrosion sensor circuit 30 is installed in an apparatus to detect a corrosion state of the apparatus. The apparatus is, for example, an air conditioner. The names of the constituent elements of the corrosion sensor circuit 30 are called and requirements to be met by the constituent elements are described only with respect to different points from the first embodiment, and descriptions of common matters are omitted.

The microcontroller 301 includes an input port 310. As the input port 310, either an analog-digital (AD) conversion port that reads voltage or an input port that detects a logical value "High" or "Low" may be used. The configuration according to the second embodiment is advantageous in that corrosion of the corrosion sensors can be detected in stages with the logical value, compared to that of the first embodiment.

In FIG. 3, the corrosion sensor 302 is connected to a power terminal at one end and to the input port 310 via the resistor 303 at an opposite end. The corrosion sensor 304 is connected to the input port 310 at one end and to ground via the resistor 305 at an opposite end. The corrosion sensor 306 is connected to a power terminal at one end and to the input port 310 via the resistor 307 at an opposite end. The resistor 308 is connected to the input port 310 at one end and to the ground at an opposite end. The resistors 303 and 307 are pull-up resistors connected to the corrosion sensors 302 and 306, respectively. The resistor 305 is a pull-down resistor connected to the corrosion sensor 304. The resistor 308 is a pull-down resistor connected to no corrosion sensors. The resistor 308 is attached to prevent a logic at the input port 310 from becoming high-impedance even when all the corrosion sensors 302, 304, and 306 become in an open state.

In this description, the resistors 303, 305, and 307 connected to the corrosion sensors 302, 304, and 306 may be collectively referred to as the "first resistors", and the resistor 308 not connected to the corrosion sensors 302, 304, and 306 may be referred to as the "second resistor". The resistors 303 and 307 connected to the corrosion sensors 302 and 306 on a pull-up side may be referred to as the "first pull-up resistor" and the "second pull-up resistor", respectively. The resistor 305 connected to the corrosion sensor 304 on a pull-down side may be referred to as the "first pull-down resistor".

Figure 4:
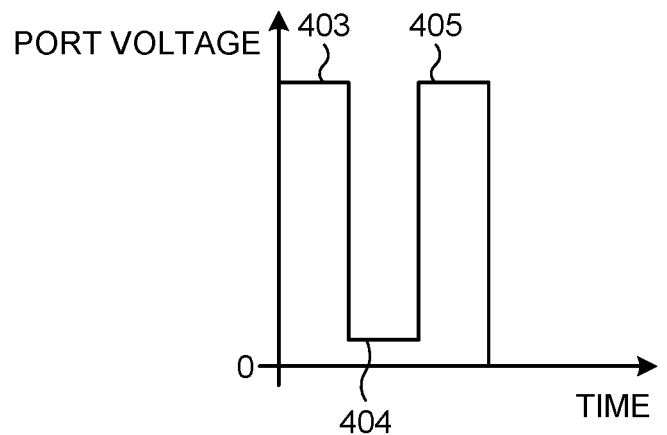
FIG. 4 is a diagram explaining an operation of the corrosion sensor circuit according to the second embodiment.

With reference to FIGS. 3 and 4, a description is provided next of operation of the corrosion sensor circuit 30 according to the second embodiment. FIG. 4 is a diagram explaining an operation of the corrosion sensor circuit 30 according to the second embodiment operates. In FIG. 4, a vertical axis represents port voltage, and a horizontal axis represents time. The port voltage refers to a voltage value that appears at the input port 310 of the microcontroller 301. The microcontroller 301 reads this voltage as the logical value. In the example of FIG. 4, settings are such that R1=100 [Ω], R2=1 [kΩ], R3=10 [kΩ], and R4=100 [kΩ]. These resistance values are examples. The resistors may have any resistance values set to enable the microcontroller 301 to read the logical value "High" or "Low". These resistance values are determined on the assumption that the corrosion sensors 302, 304, and 306 become open in this order. Therefore, the corrosion sensors 302, 304, and 306 are configured to respectively have metal thicknesses increasing in this order. Metals as materials of the corrosion sensors 302, 304, and 306 are preferably identical but are not necessarily identical.

With all the corrosion sensors 302, 304, and 306 not open initially, a power supply voltage appears at the input port 310 as one that is based on a voltage dividing ratio between a combined resistance value of two series circuits that respectively have the corrosion sensors 302 and 306 connected and a combined resistance value of the resistor 308 and a series circuit that has the corrosion sensor 304 connected. However, in the example of FIG. 4, the voltage dividing ratio is determined mainly by the resistance values, R1=100 [Ω] and R2=1 [kΩ], so the voltage of about 9/10 of the power supply voltage appears at the input port 310. Therefore, even when the input port 310 is the input port that detects the logical value, the voltage 403 which is sufficient to ensure the detection of "High" can be maintained.

As time passes, the corrosion sensor 302 becomes open next, and the power supply voltage appears at the input port 310 as a voltage that is based on a voltage dividing ratio between R3=10 [kΩ] and R2=1 [kΩ], namely the voltage that is about 1/11 (=1/(10+1)) of the power supply voltage. This voltage is represented as a voltage 404 in FIG. 4. Even when the input port 310 is the input port that detects the logical value, the voltage 404 has a voltage level sufficient for the detection of "Low".

As time passes further, the corrosion sensor 304 becomes open, and the power supply voltage appears at the input port 310 as a voltage that is based on a voltage dividing ratio of (100/(10+100)=10/11) based on R3=10 [kΩ] and R4=100 [kΩ], namely the voltage that is 10/11 of the power supply voltage. This voltage is represented as a voltage 405 in FIG. 4. Even when the input port 310 is the input port that detects the logical value, the voltage 405 has a voltage level sufficient for the detection of "High". When all the corrosion sensors 302, 304, and 306 eventually become open, only R4=100 [kΩ] remains, causing the logic to be "Low".

Through the above-described changes, the input port 310 is capable of detecting the corrosion of the corrosion sensors in stages with the logical value. This allows for estimation of a degree of corrosion of the corrosion sensors 302, 304, and 306 in stages. Moreover, with the change of the logical value, a rate at which the corrosion progresses, too, can be estimated.

Third Embodiment

A general-purpose microcontroller has multiple functions and has various ports corresponding to the functions. For example, a microcontroller installed in an air conditioner includes communication ports for communication with other printed boards or devices, input ports where logical values output from sensors are read, and input ports where rotational speeds of motor devices such as fan motors are read, among others. Some of these ports communicate with other printed boards and devices with push-pull outputs. In cases where a connection destination is a circuit that does not use initial logic at the time of high impedance, a configuration such as in FIG. 5 enables detection of an open state of a corrosion sensor without a dedicated port.

Figure 5:
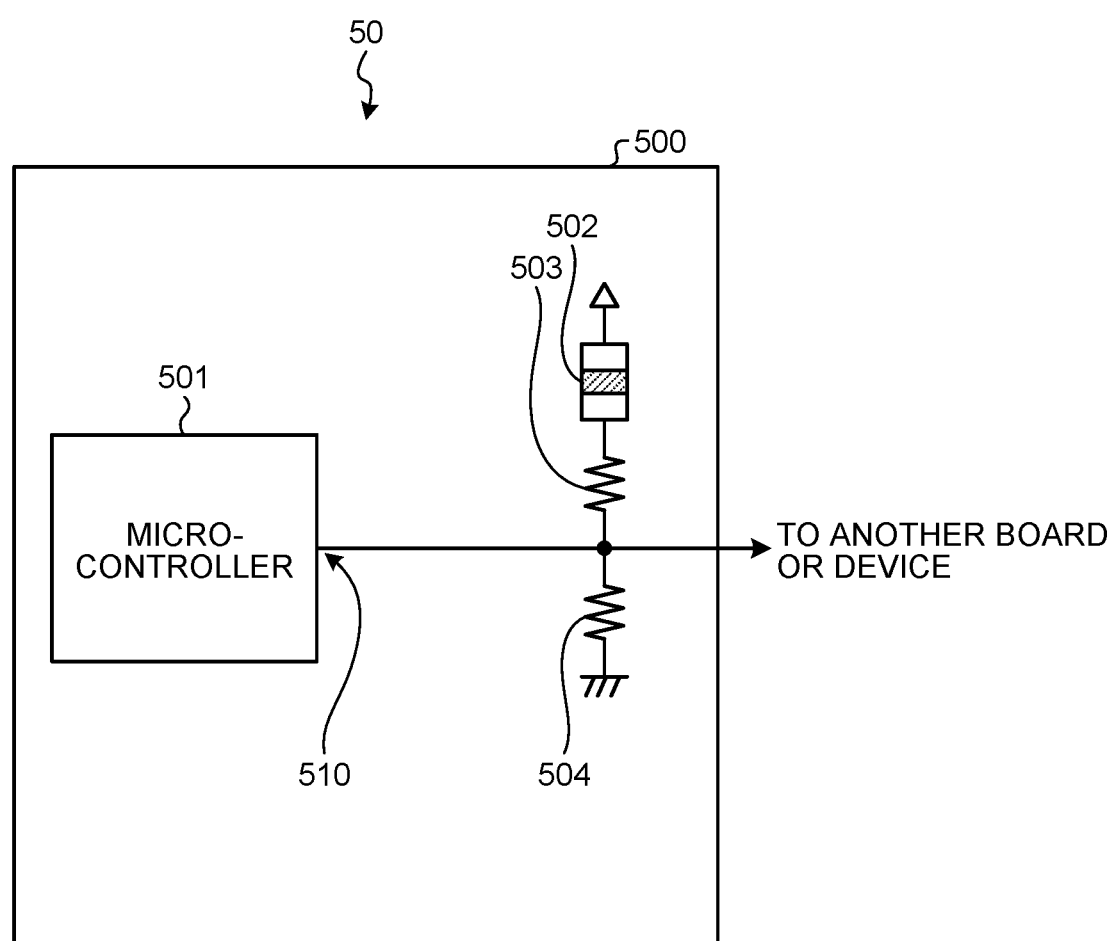
FIG. 5 is a diagram illustrating a configuration example of a corrosion sensor circuit according to a third embodiment.

FIG. 5 is a diagram illustrating a configuration example of a corrosion sensor circuit 50 according to a third embodiment. As illustrated in FIG. 5, the corrosion sensor circuit 50 includes a microcontroller 501, a corrosion sensor 502, and resistors 503 and 504. These constituent elements are mounted on a printed board 500. The corrosion sensor circuit 50 is installed in an apparatus to detect a corrosion state of the apparatus. The apparatus is, for example, an air conditioner. The names of the constituent elements of the corrosion sensor circuit 50 and requirements to be met by the constituent elements are described only with respect to different points from other embodiments, and descriptions of common matters are omitted.

The microcontroller 501 includes a port 510. The port 510 is a port that does not use logic at the time of high impedance. The corrosion sensor 502 is connected to a power terminal at one end and to the port 510 via the resistor 503 at an opposite end. The resistor 504 is connected to the port 510 at one end and to ground at an opposite end. In the configuration of FIG. 5, the corrosion sensor 502 and the resistor 503 are disposed on a pull-up side, while the resistor 504 is disposed on a pull-down side. However, this arrangement may be reversed. In other words, the resistor 504 may be disposed on the pull-up side, with the corrosion sensor 502 and the resistor 503 disposed on the pull-down side.

A greater resistance value of the resistor 504 and a smaller resistance value of the resistor 503 cause a logical value at the port 510 to be "High" when the corrosion sensor 502 is not open. When the corrosion sensor 502 becomes open, the logical value at the port 510 becomes "Low". By detecting this logical value, the port 510 can determine whether the corrosion sensor 502 is open or not.

The port 510 may be an output port or an input port. In cases where the port 510 is the input port, its inactive state of operation is utilized for reading voltage or logical-value. When, for example, the input port is an input port to which the voltage, the logical value, or a signal is not constantly input, its idle time is utilized. In the case of the air conditioner, examples of this include output of a stepping motor that drives vanes, input of rotational speed with the fan motor not operating, and universal asynchronous receiver-transmitter (UART) communication. When, for example, the port 510 is a port to which the rotational speed of the fan motor is input, the logical value is constant if a fan does not rotate. Thus, by detecting the change of the logical value, a state change of the corrosion sensor can be detected. With this type of usage, resources of the microcontroller 501 can be saved.

In cases where the port 510 is the output port, the microcontroller 501 may perform, by using the function of the microcontroller 501, switching a function of the port 510 from an output port function to an input port function temporarily so as to detect the voltage or the logical value at the port 510. With this type of usage, the resources of the microcontroller 501 can be saved.

The corrosion sensor circuit according to the third embodiment is capable of estimating a degree of corrosion of the corrosion sensor on the basis of the detection value that is detected at the input port when the input port does not receive a communication signal and an input signal. Alternatively, the corrosion sensor circuit is capable of estimating the degree of corrosion of the corrosion sensor on the basis of the detection value that is detected at the output port when the output port does not transmit an output signal to another printed board or a device. The input or output port does not have to be a dedicated port, and the existing port can be utilized. Even an existing port that is used for another purpose may be used provided that its temporary idle time can be used. Since this type of usage is possible, the corrosion sensor circuit according to the third embodiment can effectively utilize the resources of the existing microcontroller.

Fourth Embodiment

Figure 6:
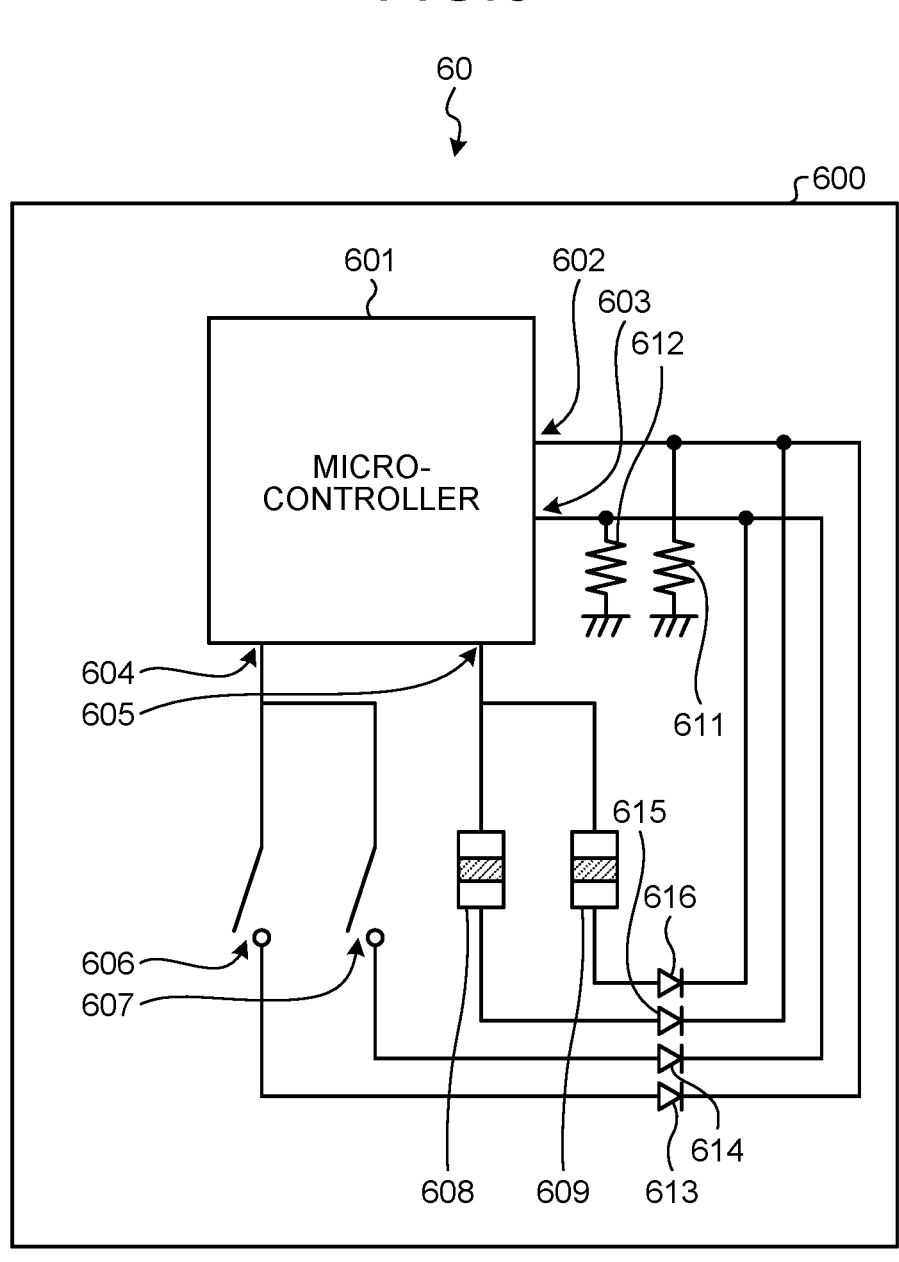
FIG. 6 is a diagram illustrating a configuration example of a corrosion sensor circuit according to a fourth embodiment.

FIG. 6 is a diagram illustrating a configuration example of a corrosion sensor circuit 60 according to a fourth embodiment. As illustrated in FIG. 6, the corrosion sensor circuit 60 includes a microcontroller 601, corrosion sensors 608 and 609, resistors 611 and 612, switches 606 and 607, and diodes 613, 614, 615, and 616 that serve as backflow prevention elements. These constituent elements are mounted on a printed board 600. The corrosion sensor circuit 60 is installed in an apparatus to detect a corrosion state of the apparatus. The apparatus is, for example, an air conditioner. The names of the constituent elements of the corrosion sensor circuit 60 and requirements to be met by the constituent elements are described only with respect to different points from other embodiments, and descriptions of common matters are omitted.

The microcontroller 601 according to the fourth embodiment includes input ports 602 and 603 and output ports 604 and 605. A configuration for this microcontroller 601 is such that a logical value output from each of the output ports 604 and 605 is detected at the input ports 602 and 603. Such a circuit is called the "matrix circuit". Using the switches 606 and 607 additionally, the matrix circuit of FIG. 6 allows for detection of four (2×2=4) patterns of logical-value combinations, as given by multiplication of two outputs from the output ports 604 and 605 by two inputs to the input ports 602 and 603. If the number of input ports and the number of output ports increase, a scale benefit of the matric circuit can be enjoyed. Therefore, when the number or variety of corrosion sensors is increased to improve estimation accuracy of the corrosion sensor circuit 60, a reduced number of required ports is enabled, leading to restrained manufacturing costs.

In air conditioners, there are printed boards mounted with a plurality of switches and printed boards that have matrix circuits configured. If corrosion sensors can be connected in place of switches on these printed boards, detection of a degree of corrosion of the printed board becomes possible.

A description is provided next of connections in the corrosion sensor circuit 60 according to the fourth embodiment. In FIG. 6, the resistor 611 is connected to the input port 602, and the resistor 612 is connected to the input port 603. The resistors 611 and 612 are pull-down resistors. The output port 604 is connected to the input port 602 via the switch 606 and the diode 613 and to the input port 603 via the switch 607 and the diode 614. The output port 605 is connected to the input port 602 via the corrosion sensor 608 and the diode 615 and to the input port 603 via the corrosion sensor 609 and the diode 616. In this description, the input ports 602 and 603 may be referred to as the "first input port" and the "second input port", respectively, and the output ports 604 and 605 may be referred to as the "first output port" and the "second output port", respectively. The switches 606 and 607 may be referred to as the "first switch" and the "second switch", respectively.

The corrosion sensors 608 and 609 are disposed in similar positions correspondingly to the switches 606 and 607. The diodes 613 and 615 respectively provided after the switch 606 and the corrosion sensor 608 prevent a short circuit between output terminals when the outputs of the output ports 604 and 605 have different logical values from each other. The diodes 614 and 616, too, serve the same function. The resistors 611 and 612 that are, as mentioned earlier, the pull-down resistors are disposed after the diodes 613, 614, 615, and 616. When the output port 604 or 605 becomes "High", voltages each resulting from a voltage drop of Vf across the diode are input to the input ports 602 and 603, even though that depends on operating voltage. In cases where the voltages detected by the input ports 602 and 603 fall within a range for "High" and a range for "Low", "High" and "Low" are detectable in this configuration. On the other hand, if the operating voltage is lower and given the voltage drop of Vf, the logical value "High" cannot be determined, in which case transistors may be inserted in place of the diodes. The transistor is another example of the backflow prevention element. The transistor facilitates the determination of the logical value "High" compared with the diode, since a turn-on voltage of the transistor is low. In this description, the diodes 613, 614, 615, and 616, as well as the transistors that are alternatives to these diodes, may be referred to as the "first backflow prevention element", the "second backflow prevention element", the "third backflow prevention element", and the "fourth backflow prevention element", respectively.

A description is provided next of how the corrosion sensor circuit 60 according to the fourth embodiment operates. When the microcontroller 601 initially sets the logical value of the output port 605 to "High", with the logical value of the output port 604 being "Low", regardless of states of the switches 606 and 607, the logical value of the corrosion sensor 608 appears at the input port 602, and the logical value of the corrosion sensor 609 appears at the input port 603. At a shifted timing, the voltage of the output port 604 is set to "High" and the voltage of the output port 605 is set to "Low", in which case logical states of the switches 606 and 607 appear at the input ports 602 and 603, respectively. For example, when the logical value of the output port 604 is "High", with the logical value of the output port 605 being "Low", "High" appears at the input port 602 if the switch 606 is on, and "Low" appears at the input port 602 if the switch 606 is off. Similarly, "High" appears at the input port 603 if the switch 607 is on, and "Low" appears at the input port 603 if the switch 607 is off when the logical value of the output port 604 is "High", with the logical value of the output port 605 being "Low". As shown in the above operation, both the on-off states of the switches 606 and 607 and the logical states of the corrosion sensors 608 and 609 can be confirmed at the timings when the output ports 604 and 605 are set to "High".

Figure 7:
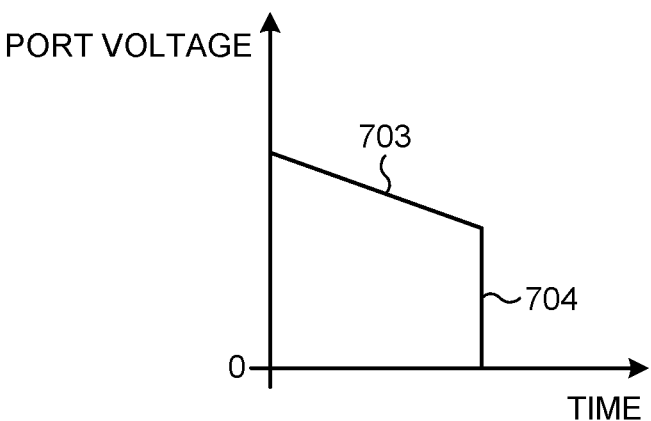
FIG. 7 is a diagram explaining an operation of the corrosion sensor circuit according to the fourth embodiment.

The above description has been of the case where the input ports 602 and 603 are input ports that detect the logical values. With reference to FIGS. 6 and 7, a description is also provided here of operation when the input ports 602 and 603 are AD conversion ports. FIG. 7 is a diagram explaining the operation of the corrosion sensor circuit 60 according to the fourth embodiment. In FIG. 7, a vertical axis represents port voltage, and a horizontal axis represents time. The port voltages refer to voltage values that appear at the input port 602 and 603 of the microcontroller 601 and are read by the microcontroller 601. Since operations are the same for the input ports 602 and 603, the operation for the input port 602 is described here.

The output port 605 is set to "High", in which case the voltage resulting from the voltage drop of Vf across the diode 615 appears. The corrosion sensor 608 itself has an increasing resistance value due to corrosion. Since a voltage dividing ratio between the resistance value of the corrosion sensor 608 and a resistance value of the resistor 611 gradually decreases accordingly, the voltage at the input port 602, too, gradually decreases. The port voltage during this time is represented by a first descent section 703 in FIG. 7. As the corrosion of the corrosion sensor 608 progresses, the corrosion sensor 608 becomes open at a certain timing. At this timing, the port voltage decreases steeply along a second descent section 704 shown in FIG. 7 and approaches 0 [V].

In the case where the input port 602 is the input port that detects the logical value, the input port 602 is capable of detecting the open state of the corrosion sensor 608 when the logical value is "Low". In the case where the input port 602 is the AD conversion port, a degree of corrosion of the corrosion sensor 608 can be estimated on the basis of a relationship between a voltage state of the first descent section 703 and an elapsed time.

The corrosion sensor circuit according to the fourth embodiment is configured by adding the corrosion sensors to the board on which the matrix circuit is configured including the microcontroller's first and second input ports, the microcontroller's first and second output ports, and the corresponding switches. In cases where the first and second input ports are the input ports that detect the logical values, the microcontroller is capable of detecting the progress of the corrosion of each of the corrosion sensors on the basis of the changes of the logical values of the first and second input ports. In this way, a corrosion state of the board mounted with the corrosion sensors can be estimated.

By adding the corrosion sensors to the existing board that includes the microcontroller and the switches as in the above description, the corrosion sensor circuit can be configured with no major changes to the circuit or no addition of new ports to the microcontroller and enables diagnosis of the corrosion state of the board.

In cases where the first and second input ports are the analog-digital conversion ports in the fourth embodiment, the microcontroller is capable of detecting corrosion states on the basis of the changes of the voltages at the first and second input ports. In this way, the corrosion state of the board mounted with the corrosion sensors can be estimated.

While the configuration described in the fourth embodiment includes the single two-by-two matrix circuit that includes the two input ports and the two output ports, this is not limiting. The input ports may be three or more in number. The output ports, too, may be three or more in number. If the number of input and output ports are increased, the scale benefit of the matrix circuit can be enjoyed, and the corrosion state can be diagnosed with increased accuracy.

Fifth Embodiment

Figure 8:
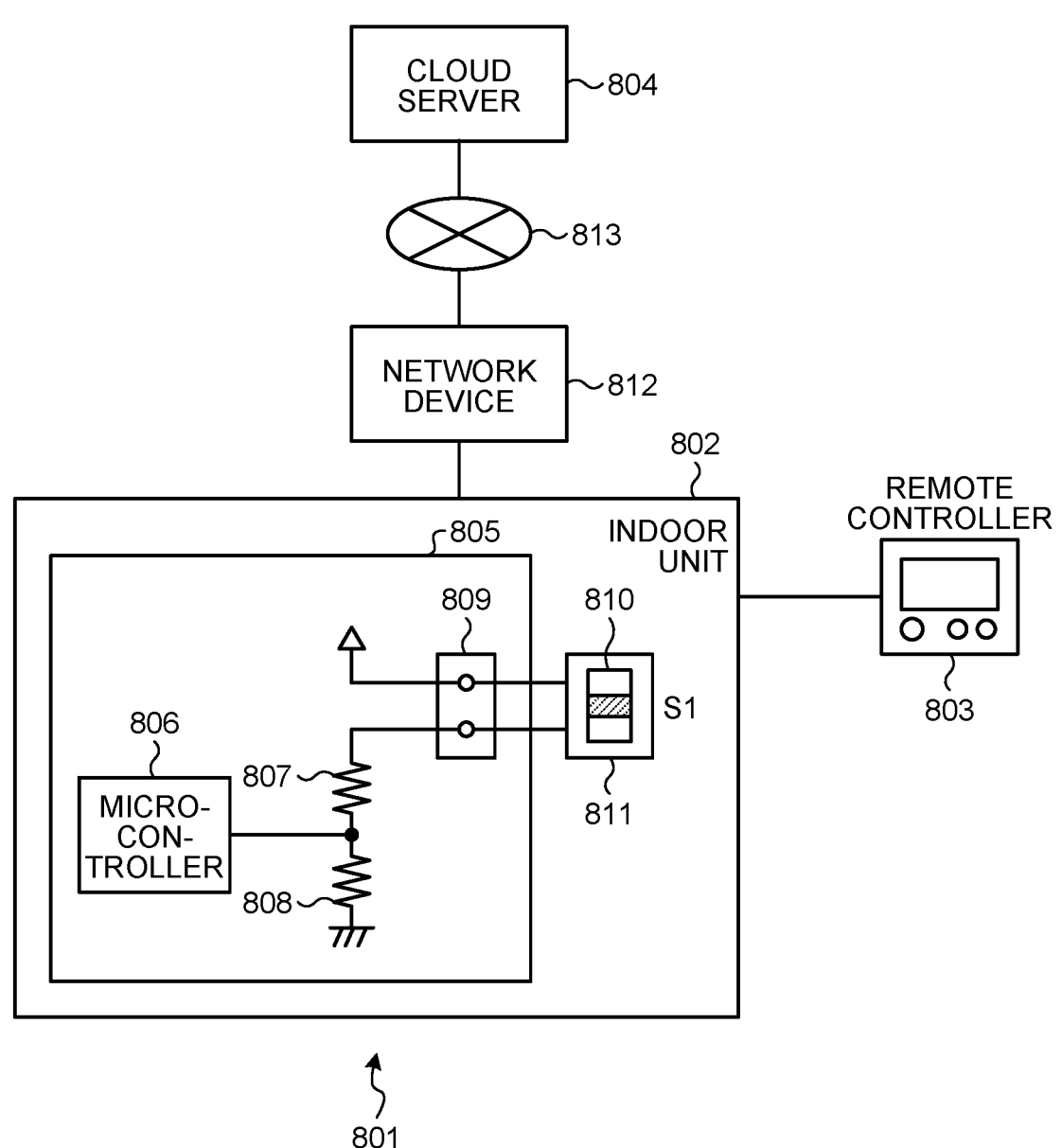
FIG. 8 is a diagram illustrating a configuration example of an air conditioner and a corrosion diagnosis system according to a fifth embodiment.

FIG. 8 is a diagram illustrating a configuration example of an air conditioner 801 and a corrosion diagnosis system 800 according to a fifth embodiment. In FIG. 8, an indoor unit 802 and a remote controller 803 are illustrated as the air conditioner 801 according to the fifth embodiment. An outdoor unit is not illustrated. The indoor unit 802 is configured to be connectable to an Internet network 813 via a network device 812 such as a Wi-Fi (registered trademark) router. A cloud server 804 is built on the Internet network 813. The remote controller 803 is connected to the indoor unit 802 to be enabled to control operation states such as cooling, heating, and dehumidification, a set temperature for a space to be cooled and heated, and others. The corrosion diagnosis system 800 is composed of the indoor unit 802 and the remote controller 803 of the air conditioner 801 and the cloud server 804. The Internet network 813 is an example, and any network can be used regardless of whether the network is wired or wireless. The cloud server 804, too, is an example, and any server apparatus that is connectable to the indoor unit 802 can be used.

The indoor unit 802 includes a printed board 805. A microcontroller 806, a pull-down resistor 808, a sensor series resistor 807, and a connector 809 are mounted on the printed board 805. A corrosion sensor 810 is mounted on a sensor board 811 which is a separate board different from the printed board 805. The corrosion sensor 810 is connected to the sensor series resistor 807 via the connector 809. In other words, the corrosion sensor 810 is connectable to the connector 809 on the printed board 805 and is detachable. In this description, the printed board 805 is referred to as the "first board", and the sensor board 811 is referred to as the "second board".

The air conditioner 801, as configured thus, enables the corrosion sensor 810 appropriate to an installation environment to be selected. For example, a sensor that reacts to hydrogen sulfide can be attached so as to enable detection of hydrogen sulfide in a place with a lot of waste. After the sensor deteriorates due to its corrosion, the sensor can be replaced with a new corrosion sensor 810. Therefore, the printed board 805 and the sensor board 811 can be used again. This facilitates maintenance and allows for reduction of maintenance costs.

The cloud server 804 collects corrosion information detected or identified by each of the corrosion sensor circuits according to the first through fourth embodiments. On the basis of the corrosion information, the cloud server 804 diagnoses a corrosion state of the air conditioner 801. Specifically, the cloud server 804 performs tasks such as estimating the degree of corrosion for each corrosive substance and predicting the progress of corrosion and determining whether or not unit or board replacement is to be done and whether or not corrosion sensor replacement is to be done.

Diagnostic information of the cloud server 804 can be displayed on a display of the remote controller 803. In cases where a maintenance company can have access to the diagnostic information of the cloud server 804, the maintenance company can prompt a user to have the unit and board replacement done. The progress of corrosion can also be displayed, enabling an announcement regarding an environmental improvement to be made to the user. If the degree of corrosion for each corrosive substance is known, the substance that is the main cause of the corrosion can be identified, enabling prediction of deterioration states of components whose corrosion states are not directly detected, such as a fan motor. This allows for prompting the user to replace other components not directly detected for their corrosion states.

While displaying the diagnostic information of the cloud server 804 on the display of the remote controller 803 has been described above, a result of detection by the microcontroller 806 may be displayed on the display of the remote controller 803. This allows for a simple diagnosis of the corrosion state of the air conditioner 801 even if there is no network environment established.

The above configurations illustrated in the embodiments are illustrative, can be combined with other techniques that are publicly known, and can be partly omitted or changed without departing from the gist. The embodiments can be combined with each other.

The invention claimed is:

1. A corrosion sensor circuit to detect a corrosion state of an apparatus, the corrosion sensor circuit comprising:
   a microcontroller;
   one or more corrosion sensors connected to an input port of the microcontroller; and
   one or more first resistors connected to the input port, each of the one or more first resistors being connected to each of the one or more corrosion sensors, respectively,
   wherein
   the one or more corrosion sensors include a first corrosion sensor, a second corrosion sensor that reacts to a property of a different corrosive substance compared with the first corrosion sensor, and a third corrosion sensor that reacts to a property of a different corrosive substance compared with the first corrosion sensor and the second corrosion sensor,
   the one or more first resistors include a first pull-up resistor connected to the first corrosion sensor, a second pull-up resistor connected to the second corrosion sensor, and a first pull-down resistor connected to the third corrosion sensor, and
   the corrosion sensor circuit further comprises a second resistor that is directly connected to the third corrosion sensor and is not directly connected to both the first corrosion sensor and the second corrosion sensor.

2. The corrosion sensor circuit according to claim 1, wherein
   the microcontroller detects a voltage at the input port and estimates the apparatus's corrosion state based on the voltage detected.

3. The corrosion sensor circuit according to claim 1, wherein
   the microcontroller detects a logical value at the input port and estimates the apparatus's corrosion state based on the logical value detected.

4. The corrosion sensor circuit according to claim 1, wherein
   the number of the one or more corrosion sensors is three or more, and
   the three or more corrosion sensors include a plurality of corrosion sensors that react to properties of different corrosive substances.

5. The corrosion sensor circuit according to claim 1, wherein
   the number of the one or more corrosion sensors is three or more, and
   the three or more corrosion sensors are made of different metals as materials.

6. The corrosion sensor circuit according to claim 1, wherein the number of the one or more corrosion sensors is three or more, and the three or more corrosion sensors are made of identical metals and have different metal thicknesses.

7. The corrosion sensor circuit according to claim 6, wherein the microcontroller computes, for each of the one or more corrosion sensors, an amount of change in resistance value of a series circuit of each of the one or more corrosion sensors and a respective first resistor of the one or more first resistors and estimates a degree of corrosion based on a mean of the amount of change.

8. The corrosion sensor circuit according to claim 1, wherein
   the first pull-up resistor is connected to the first corrosion sensor, and the second pull-up resistor is connected to the second corrosion sensor, on a pull-up side.

9. The corrosion sensor circuit according to claim 8, wherein
   the first pull-down resistor is connected to the third corrosion sensor on a pull-down side.

10. The corrosion sensor circuit according to claim 1, wherein
    the first pull-down resistor is connected to the third corrosion sensor on a pull-down side.

11. The corrosion sensor circuit according to claim 1, wherein the microcontroller detects a voltage at the input port and estimates a degree of corrosion of each of the one or more corrosion sensors based on an amount of change in the voltage detected over time.

12. The corrosion sensor circuit according to claim 1, wherein each of the one or more corrosion sensors and a respective first resistor of the one or more first resistors are connected to the input port of the microcontroller, the input port is an input port that does not use logic at a time of high impedance, and the microcontroller detects a voltage or a logical value at the input port.

13. The corrosion sensor circuit according to claim 12, wherein
    the microcontroller estimates a degree of corrosion of each of the one or more corrosion sensors based on a detection value that is detected at the input port when the input port does not receive a communication signal and an input signal.

14. The corrosion sensor circuit according to claim 1, wherein
    the microcontroller, the one or more corrosion sensors, the one or more first resistors, and the second resistor are mounted on a printed board,
    the one or more corrosion sensors have no corrosion-resistant coating, and
    other circuit components except for the one or more corrosion sensors have a corrosion-resistant coating.

15. The corrosion sensor circuit according to claim 1, wherein the number of the one or more corrosion sensors is three or more, and the microcontroller detects a voltage at the input port and identifies a substance that is a main cause of corrosion based on an amount of change in the voltage detected.

16. The corrosion sensor circuit according to claim 1, wherein the number of the one or more corrosion sensors is three or more, and the microcontroller detects a logical value at the input port and identifies a substance that is a main cause of corrosion based on a change of the logical value detected.

17. The corrosion sensor circuit according to claim 1, wherein the number of the one or more corrosion sensors is three or more, and the microcontroller detects, for each of the one or more corrosion sensors, a variance of a resistance value of a series circuit of each of the one or more corrosion sensors and a respective first resistor of the one or more first resistors and identifies, based on information on the variance, a respective corrosion sensor of the one or more corrosion sensors connected in the series circuit where the resistance value indicates an open state.

18. The corrosion sensor circuit according to claim 17, wherein
    when order of the open state indicated by the resistance values and a relationship between a rate of increase in resistance value and a rate of decrease in voltage to be detected by the microcontroller are known in advance, a degree of corrosion of each of the one or more corrosion sensors is estimated based on the rate of decrease in the voltage.

\* \* \* \* \*